United States Patent Office 3,212,711
Patented Oct. 19, 1965

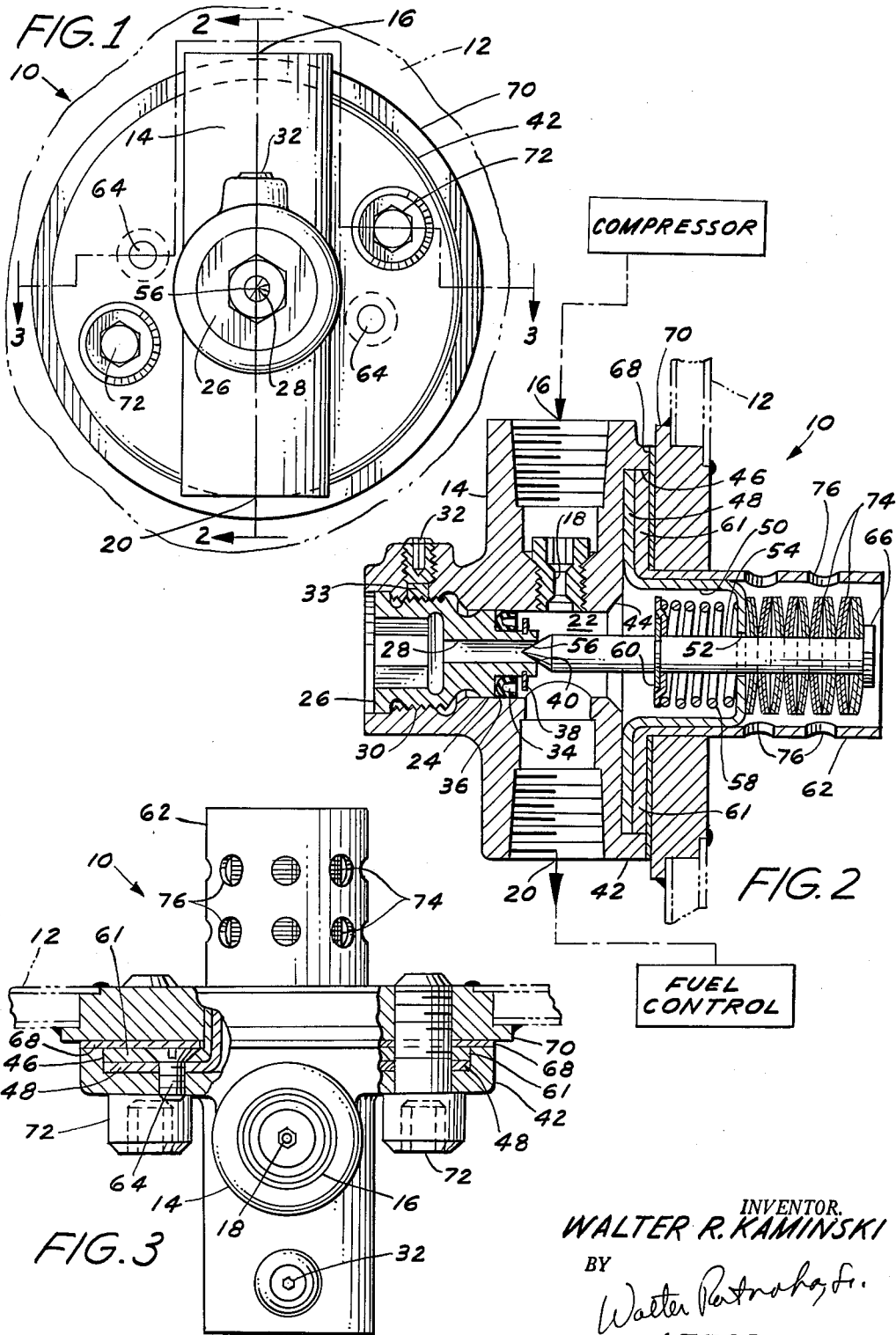

3,212,711
TEMPERATURE RESPONSIVE PRESSURE CONTROL DEVICE
Walter R. Kaminski, Ferndale, Mich., assignor to Holley Carburetor Company, Warren, Mich., a corporation of Michigan
Filed Feb. 21, 1963, Ser. No. 260,135
3 Claims. (Cl. 236—87)

This invention relates generally to pressure control devices, and more specifically to devices adapted to modify a pressure supply or signal in accordance with the temperature at some point in a system.

There are numerous applications where a device operates in response to a pressure signal that must be modified in accordance with some variable temperature. One example of such an application is a gas turbine engine having a regenerator. The main fuel control for a gas turbine engine operates in response to one or more parameters; in many cases one of these parameters is compressor discharge pressure. However, where the engine is equipped with a regenerator, it may be necessary to modify the compressor discharge pressure signal in accordance with the temperature in the regenerator.

Accordingly, a main object of the invention is to provide a temperature resonsive pressure bleed valve device adapted to reduce a pressure signal whenever the temperature being sensed exceeds a critical value.

Another object of the invention is to provide such a device in which the temperature responsive means is capable of functioning at the relatively high temperature ranges encountered in the operation of a gas turbine engine and the response of which is linear with changes in temperature.

Other more specific objects and advantages of the invention will become apparent when reference is made to the following specification and accompanying drawings wherein:

FIGURE 1 is a plan view of a device embodying the invention mounted on any suitable housing.

FIGURE 2 is a cross-sectional view taken along the plane of line 2—2 of FIGURE 1 and looking in the direction of the arrows;

FIGURE 3 is a view in partial cross section taken on the plane of line 3—3 of FIGURE 1 and looking in the direction of the arrows.

Referring to the drawings in greater detail, FIGURE 1 illustrates a pressure control device 10 mounted by any suitable means, such as by bolts 72, on a wall 12 beyond which the temperature is to be sensed. As seen in FIGURE 2, the pressure control device 10 may comprise a body 14 having a threaded inlet port 16 including a restriction 18, a threaded outlet port 20, a central chamber 22 disposed between the inlet and outlet ports 16 and 20, and a transverse passageway 24 leading from the chamber 22. An Allen-head plug 26 having an axial bleed passage 28 and external threads 30 is threadedly inserted in the transverse passageway 24. Once inserted and adjusted, the plug 26 may be held in place by a set screw 32 and a locking plug 33 of soft copper or other suitable material. A seal 34 may be provided in a groove or recess 36 around the plug 26 for sliding engagement with the wall of the passageway and confined for movement with the plug 26 by a retaining ring 38. The inner end of the plug 26 serves as a valve seat 40.

The body 14 may further include an external flange 42 (FIGURES 1 and 3) and an opening 44 through the center thereof (FIGURE 2) communicating with the chamber 22 opposite the transverse passageway 24. The flange 42 may also include a counterbored recess 46 into which a flanged cup-like spring seat 48 may be inserted opposite the valve seat 40. The spring seat 48 forms a chamber 50 in direct communication with the chamber 22 and includes a central opening 52 through which a valve stem 54 extends. Should leakage through the clearance between the valve stem 54 and the opening 52 prove to be a problem in a particular application, either a bellows unit or a labyrinth seal could be included to prevent such leakage. One end of the valve stem 54 is formed to include a tapered valve 56 which is urged against the valve seat 40 by some resilient means such as the spring 58. The spring 58 surrounds the valve stem 54, and one end thereof abuts against the permanently fixed spring seat 48 while the other end is retained by a retainer 60 which is fixedly attached to the movable valve stem 54.

The spring seat 48 may be confined against the main body 14 in the recess 46 by a flange 61 formed on a body 62 which extends beyond the collared end 66 of the valve stem 54. The flange 61 of the body 62 and the spring seat 48 may be fastened to the flange 42 by a screw 64 (FIGURE 3) and covered by a gasket 68 and a mounting boss 70, with the mounting boss 70, gasket 68, flanged body 62, spring seat 48 and the external flange 42 of the main body 14 being fastened together as a unit by bolts 72 (FIGURE 3). The mounting boss 70 is, of course, fastened directly to the housing wall 12.

A plurality of temperature responsive elements, such as bimetallic disks 74 which deflect lineally with temperature, surround the valve stem 54 within the flanged body 62 and are confined axially between the spring seat 48 and the collar 66 formed on the end of the valve stem 54. The extended portion of the body 62 may include a plurality of holes 76 therethrough adjacent the bimetallic disks 74, in order that the ambient temperature or the temperature within the housing 12 may be readily communicated to the bimetallic disks 74.

In regard to the operation of the invention, it is apparent that the inlet port 16 may be connected to any desired source of pressure, such as a gas turbine engine compressor. The pressure signal thus transmitted to the inlet 16 may be transferred by way of the outlet 20 connected to some external member, such as a main fuel control responsive to compressor discharge pressure. Where an intermediate pressure or adjustment is desired, a calibrated removable restriction 18 may be included in the inlet 16.

In the usual gas turbine engine fuel control, an increasing compressor discharge pressure signal results in an increasing amount of fuel supplied to the engine. However, when the regenerator temperature increases above a certain predetermined temperature, it is desired to cut back the amount of fuel supplied to the engine. This is accomplished by forming and stacking the bimetal disks 74 in such a way that when the critical regenerator temperature is reached, the valve 56 moves away from its seat 40 to allow the compressor discharge pressure signal to be bled to atmosphere through the passage 28. The reduction in the amount of fuel supplied will eventually result in a decrease in regenerator temperature, at which time the valve 56 will again close.

It is apparent that an opposite effect may be desired; if some other temperature were being sensed; that is, it may be desired to have a valve 40 open upon a decrease in temperature. This may be accomplished very simply by merely reversing the manner of forming and stacking the bimetal disk elements 74.

In the application shown, the valve 56 is urged against the valve seat 40 by the spring 58 at or below the preselected temperature level. Should the regenerator temperature rise above this level, the bimetallic disks 74 will respond to the change by beginning to widen or bow outwardly from their centers. The widening disks 74, being anchored against the fixed spring seat 48, would urge the collar 66 of the valve stem away from the spring seat 48 and, hence, pull the valve 56 away from the seat 40, permitting the excess pressure to be bled to the atmosphere through the bleed passage 28.

In some applications, it may be desired to vary a pressure within a chamber or to vary the supply of pressure to some device, rather than to modify a pressure signal. In that event, the device 10 would again be mounted so that bimetallic disks 74 are subjected to the control temperature, but the outlet 20 would be eliminated; that is, the device 10 would have only the inlet 16 and the outlet passage 28, the latter either being connected to some device requiring a pressure or merely communicating with atmosphere.

It should be apparent from the above discussion that the invention represents a novel, compact and very efficient system for either modulating a pressure signal in accordance with changes in temperature of any selected atmosphere, or for otherwise controlling the value or supply of a particular pressure in accordance with temperature. The use of stacked bimetallic disks provides a device that is very reliable for operation at the relatively high temperatures encountered in gas turbine engine applications.

Although but one embodiment of the invention has been illustrated and described, other modifications may, of course, be possible within the scope of the appended claims.

What I claim as my invention is:

1. A temperature responsive pressure control device, comprising a housing formed to provide a chamber, a pressure supply inlet to said chamber, said inlet having a removable calibrated restriction therein, a first pressure outlet from said chamber, said first pressure outlet being substantially aligned with said inlet, a second pressure outlet from said chamber, said second pressure outlet being disposed substantially normal to said pressure inlet and said first outlet and formed to include an axially adjustable valve seat, and a valve assembly, said valve assembly including a valve adapted to engage said seat and close off said second outlet, a valve stem having a first retainer formed on the end opposite the valve and a second retainer formed intermediate the ends thereof, a fixed retainer formed as a part of said housing and located around and apart from said valve stem intermediate said first and second retainers, resilient means located between said second retainer and said fixed retainer for urging said valve in a closing direction, and temperature responsive means located between said fixed retainer and said first retainer for at times urging said valve in an opening direction against the force of the resilient means.

2. The device as described in claim 1, wherein said temperature responsive means comprise a plurality of bimetallic discs.

3. A temperature responsive pressure control device, comprising a housing formed to provide a chamber, a pressure supply inlet to said chamber, said inlet having a calibrated restriction therein, a pair of pressure outlets from said chamber, one of said pair of pressure outlets being formed to include a valve seat, and a valve assembly, said valve assembly including a valve adapted to engage said valve seat and close off said one of said pair of pressure outlets, a valve stem having a first retainer formed on the end opposite the valve and a second retainer formed intermediate the ends thereof, a fixed retainer formed as a part of said housing and located around and apart from said valve stem intermediate said first and second retainers, resilient means located between said second retainer and said fixed retainer for urging said valve in a closing direction, and temperature responsive means located between said fixed retainer and said first retainer for at times urging said valve in an opening direction against the force of the resilient means.

References Cited by the Examiner

UNITED STATES PATENTS

| 851,385 | 4/07 | Stuart | 236—87 X |
|---|---|---|---|
| 1,805,971 | 5/31 | Bristol | 236—86 |
| 1,894,842 | 1/33 | Appleberg | 73—363.1 X |
| 2,775,231 | 12/56 | Silver | 236—87 X |
| 3,090,559 | 5/63 | Bayer | 236—12 |

FOREIGN PATENTS

| 157,297 | 6/54 | Australia. |
|---|---|---|
| 337,346 | 5/59 | Switzerland. |

EDWARD J. MICHAEL, *Primary Examiner.*

ALDEN D. STEWART, *Examiner.*